UNITED STATES PATENT OFFICE.

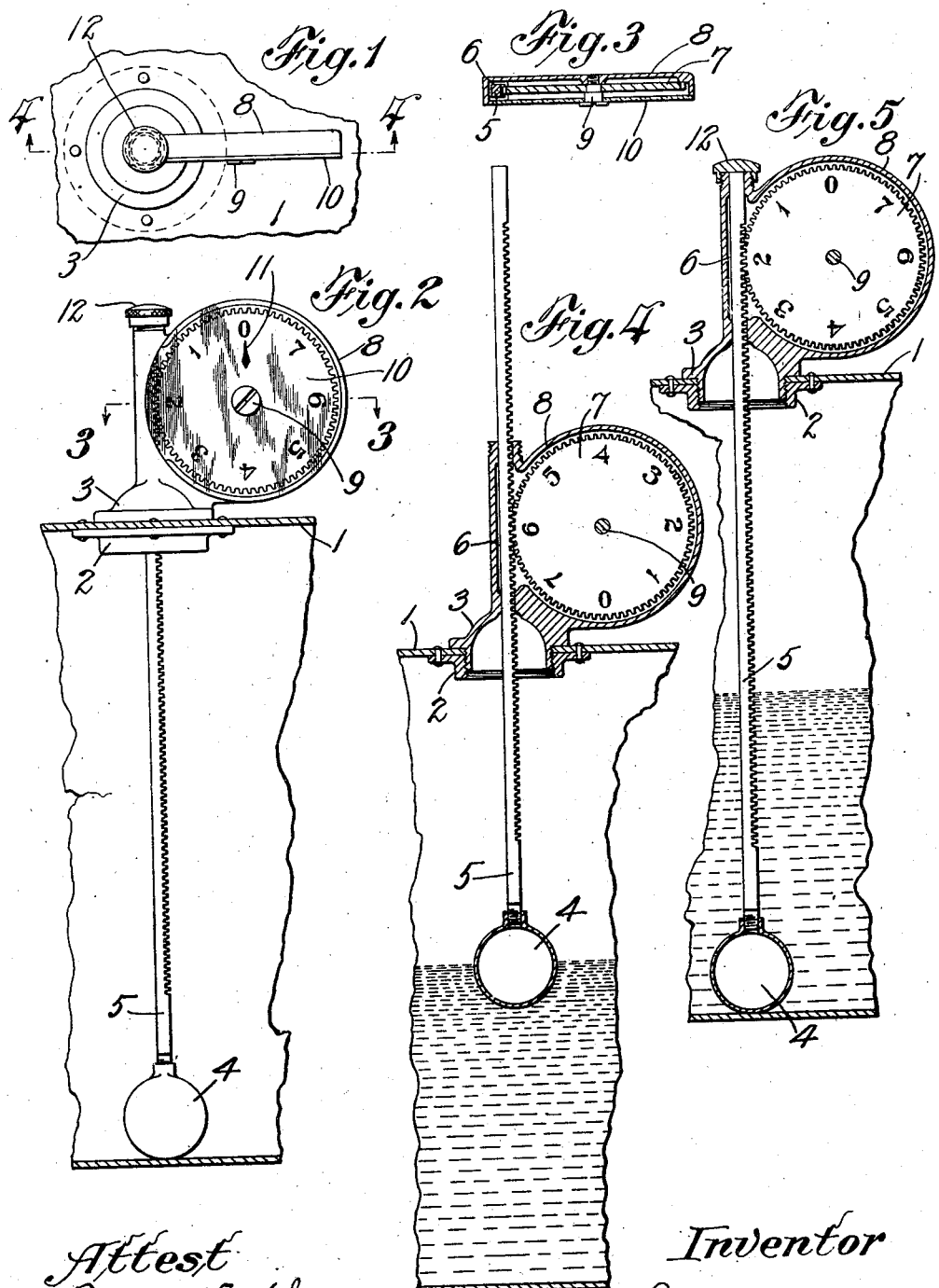

THOMAS J. MALONEY, OF JERSEY CITY, NEW JERSEY.

TANK-INDICATOR.

1,012,677.  Specification of Letters Patent.  Patented Dec. 26, 1911.

Application filed November 12, 1910. Serial No. 591,921.

*To all whom it may concern:*

Be it known that I, THOMAS J. MALONEY, a citizen of the United States, residing at Jersey City, county of Hudson, and State of New Jersey, have invented a new and useful Improvement in Tank-Indicators, of which the following is a specification.

This invention relates to an improvement in tank indicators; that is to say, devices for indicating the quantity of liquid within a tank, and it has for its main object the production of a device of this character which is readily attachable to a tank of ordinary construction and which may remain as a permanent part of the tank or be readily removed therefrom if desired.

Another object is the production of a device of this general character which is simple, inexpensive, efficient and not liable to injury.

With these and other objects not specifically mentioned in view, the invention consists in certain constructions and combinations which will be hereinafter fully described and then specifically pointed out in the claims hereunto appended.

In the accompanying drawings which form a part of this specification and in which like characters of reference indicate the same parts, Figure 1 is a plan view of a device constructed in accordance with the invention, Fig. 2 is a side elevation of the structure shown in Fig. 1, partly in section, Fig. 3 is a sectional view taken on the line 3—3 in Fig. 2 of the indicating means and rack, Fig. 4 is a sectional side elevation illustrating the operation of the device, and Fig. 5 is a similar section showing the various parts in the inoperative position in which they are normally held.

In carrying the invention into effect, there is provided a tank of any approved construction. In the device selected to illustrate the invention, a portable tank 1 is employed, this tank being of the type usually employed for storing gasolene in automobiles, airships, etc. Since the form of the tank is not essential to an understanding of the present invention, only a broken section of the same is shown in the drawings. This tank is provided with an aperture by means of which it may be filled, the aperture being formed by a flanged plate 2 riveted to the shell of the tank and provided with a threaded hole through which fluid may be poured and which is closed by a screw plug 3.

Within the tank, there is provided a float which may vary within wide limits. As shown, however, a hollow ball float 4 is employed, and this float is small enough to pass through the filling aperture of the tank so that it may be withdrawn from the tank through the aperture whenever desired. Connected with the float 4 is a member which extends to the outside of the tank, and this member may vary within wide limits. As shown, however, a stem 5 is secured to the float and extends through the bore 6 of the plug 3 before referred to. The stem is adapted to slide freely within the bore of the plug, its movement being controlled by the movement of the float which is in turn controlled by the quantity of fluid within the tank.

A scale graduated in proportion to various quantities of fluid within the tank is provided, and this scale may vary within wide limits. As shown, however, there is provided a toothed wheel 7 in mesh with teeth cut on the stem 5, and operated thereby. The wheel is supported by the plug 3 which has a substantially circular extension 8 channeled to receive it, and to which it is held by means of a screw 9. This screw 9 also serves to hold a glass plate 10 in position over the wheel. The wheel is provided with numerals arranged around its face, these numerals representing gallons or other predetermined quantities of fluid within the capacity of the tank. The glass plate is provided with a mark 11 which coöperates with the numerals on the wheel to indicate the quantity of fluid within the tank. It may be here remarked that the wheel, when a wheel is used, or other scale when another form of scale is used, is graduated in accordance with the capacity of the particular tank in connection with which the device is to be used. To fill the tank, the plug is removed, the float and stem coming away with it. After fluid has been poured into the tank, the plug is replaced and the float will cause the stem to rise. The stem, in rising, will cause the wheel to turn until the float has reached its highest position for the quantity of fluid within the tank. The quantity will then be clearly indicated by the relative positions of the mark 11 and the numerals on the wheel.

It would be inadvisable to have the stem projecting from the plug when not in actual use for the purpose of indicating the quantity of fluid within the tank, because it would be liable to injury. Means are provided, therefore, for holding the float and stem in inoperative position when not in use, and this means may vary within wide limits. As shown, there is provided a cap 12 threaded on the upper end of the plug 3, the purpose of which is to hold the float and stem in their lowermost position, as shown in Fig. 5, when not in use. It will be readily understood that after a reading of the indicator has been taken, the stem is pushed down and the cap screwed on the plug, thus housing the stem in inoperative position and preventing accidental injury to the mechanism.

In view of the foregoing, a detailed description of the operation of the device is deemed unnecessary and is omitted in the interest of brevity.

Changes and variations may be made in the structure by means of which the invention is carried into effect. The invention therefore, is not to be restricted to the precise details of the structure shown and described.

What is claimed is:

1. In a tank indicator, the combination with a tank having an aperture by means of which it may be filled, of a bored plug for closing the aperture, a float within the tank, a member connected with the float and extending through the bore of the plug to the outside of the tank, and a scale member carried by the plug and graduated in proportion to various quantities of fluid within the tank and operated by the member.

2. In a tank indicator, the combination with a tank having an aperture by means of which it may be filled, of a bored plug for closing the aperture, a float within the tank, a stem secured to the float and adapted to slide through the bore of the plug, and a scale member carried by the plug and graduated in proportion to various quantities of fluid within the tank and operated by the stem.

3. In a tank indicator, the combination with a tank having an aperture by means of which it may be filled, of a bored plug for closing the aperture, a float within the tank and adapted to pass through the filling aperture of the tank, a stem secured to the float and adapted to slide through the bore of the plug, and a scale member carried by the plug and graduated in proportion to various quantities of fluid within the tank and operated by the stem.

4. In a tank indicator, the combination with a tank having an aperture by means of which it may be filled, of a bored plug for closing the aperture, a float within the tank and adapted to pass through the filling aperture of the tank, a stem secured to the float and adapted to slide through the bore of the plug, a scale member carried by the plug and graduated in proportion to various quantities of fluid in the tank and operated by the stem, and a cap adapted to be secured on the plug and adapted to hold the stem and float in inoperative position.

5. In a tank indicator, the combination with a tank having an aperture by means of which it may be filled, of a bored plug for closing the aperture, a float within the tank and adapted to pass through the filling aperture of the tank, a stem secured to the float and adapted to slide through the bore of the plug, a wheel carried by the plug and operated by the stem and graduated in proportion to various quantities of fluid within the tank, and a cap adapted to be threaded on the plug and adapted to hold the stem and float in inoperative position.

6. In a tank indicator, the combination with a tank having an aperture by means of which it may be filled, of a bored plug for closing the aperture, a float within the tank and adapted to pass through the filling aperture of the tank, a toothed stem secured to the float and adapted to slide through the bore of the plug, a toothed wheel carried by the plug and in mesh with the toothed stem and graduated in proportion to various quantities of fluid within the tank, and a cap adapted to be threaded on the plug and adapted to hold the stem and wheel in inoperative position.

7. In a tank indicator, the combination with a tank having an aperture by means of which it may be filled, of a bored plug for closing the aperture, said plug being provided with a recessed extension on one side, a float within the tank and adapted to pass through the filling aperture of the tank, a toothed stem secured to the float and adapted to slide through the bore of the plug, a toothed wheel supported by the plug within the recessed extension and in mesh with the stem and graduated in proportion to various quantities of fluid within the tank, and a cap adapted to be threaded on the plug and adapted to hold the stem and float in inoperative position.

8. In a tank indicator, the combination with a tank having an aperture by means of which it may be filled, of a bored plug for closing the aperture, a float within the tank, a member connected with the float and extending through the bore of the plug to the outside of the tank, a scale member carried by the plug and graduated in proportion to various quantities of fluid within the tank and operated by the member, and means for holding the float and member in inoperative position.

In testimony whereof, I have signed my name to this specification in the presence of two subscribing witnesses.

THOMAS J. MALONEY.

Witnesses:
SYDNEY I. PRESCOTT,
FRANK H. VICK, Jr.